UNITED STATES PATENT OFFICE.

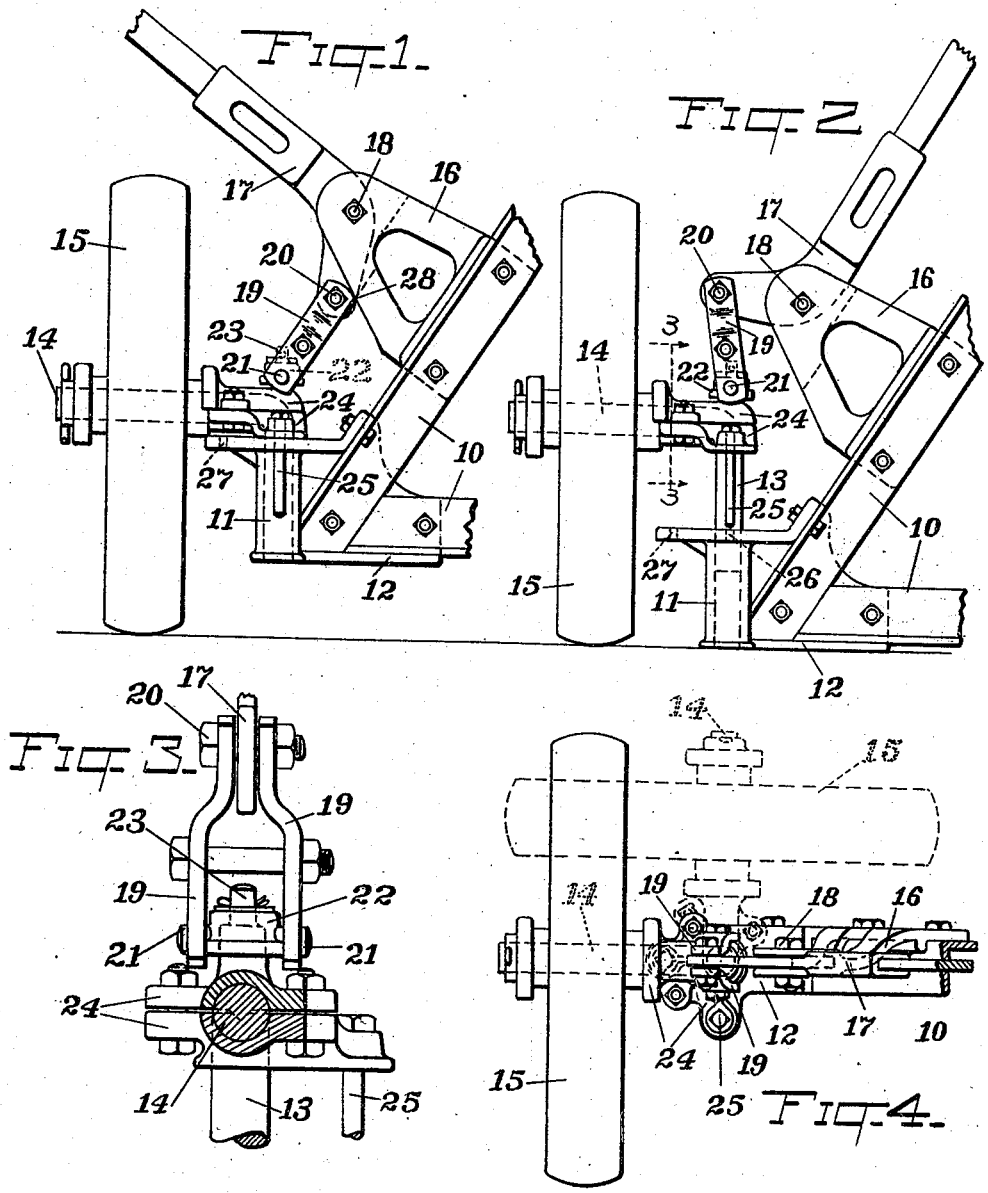

LEONARD B. NEIGHBOUR, OF MOLINE, ILLINOIS, ASSIGNOR TO DEERE & COMPANY, OF MOLINE, ILLINOIS, A CORPORATION OF ILLINOIS.

WHEEL MOUNTING.

1,416,740.  Specification of Letters Patent. Patented May 23, 1922.

Application filed April 12, 1920. Serial No. 373,158.

*To all whom it may concern:*

Be it known that I, LEONARD B. NEIGHBOUR, a citizen of the United States, and a resident of Moline, in the county of Rock Island and State of Illinois, have invented certain new and useful Improvements in Wheel Mountings, of which the following is a specification, reference being had to the accompanying drawings.

My invention relates to wheel mountings and it has for its object to provide a new and improved form and arrangement of parts by which a wheeled frame may be adjusted with respect to the supporting wheel connected therewith so as to permit the frame to rest upon the ground directly rather than to be supported through the medium of the wheel. The form of construction illustrated in the drawings is particularly designed for use upon one of the elements of a beet elevator mechanism which is adapted to be operated in fixed position with respect to a pile of beets but which must be moved from time to time in order to be kept in convenient position with respect to the diminishing pile. It will be understood that the invention is intended broadly for use upon any vehicle or structure which it is desirable to move at times upon supporting wheels and to support at other times directly upon the surface independently of the wheels. The preferred means by which I have accomplished my object is illustrated in the drawings and is hereinafter specifically described. That which I believe to be new and desire to secure by Letters Patent is set forth in the claims.

In the drawings,—

Fig. 1 is a view of my improved wheel mounting as seen looking toward one end of the vehicle or other structure a fragmentary part of which is shown, the wheel being shown in position to support the frame.

Fig. 2 is a view similar to Fig. 1 but showing the frame lowered so as to rest directly upon the ground.

Fig. 3 is an enlarged detail view being substantially a section taken on line 3—3 of Fig. 2; and Fig. 4 is a top plan view of the parts as shown in Fig. 2, an alternative position of the supporting wheel being shown in dotted lines at right angles to the position shown in solid lines.

Referring to the several figures of the drawings, in which corresponding parts are indicated by the same reference characters, 10 indicates a fragmentary portion of the frame of a vehicle or other structure to which my improvements are applied. Upon the lowermost portion of the frame 10 there is mounted a sleeve or socket member 11 which in the construction shown is formed integrally with the bracket 12 that forms a portion of the framework. An axle member comprising a vertically-disposed arm 13 and a horizontally-disposed arm 14 is mounted in the sleeve 11 so as to be slidable vertically therein and so as to be rotatable about the vertical axis thereof. A supporting wheel 15 of any suitable type is journaled upon the horizontally-disposed arm 14 of the axle member.

The means for adjusting the said frame 10 vertically with respect to the wheel 15 so as to permit the frame to rest directly upon the ground or to hold the frame in elevated position with respect to the wheel comprises a bracket 16 mounted upon the frame 10 and extending to a position substantially over the sleeve 11. The outer end of the bracket 16 is bifurcated to receive a bellcrank lever 17 which is pivotally connected with the bracket by a pivot-pin 18. As shown herein the bellcrank lever 17 has pivotally connected to it a pair of links 19, such pivotal connection being effected through the medium of a pin 20. The lower ends of the links 19 are in turn pivotally mounted upon oppositely-disposed pins 21 which extend outward from a collar 22 which is journaled upon a vertically-disposed pin 23 extending upward from a clip 24 fixedly secured upon the axle member. The clip 24 is formed of a pair of plates which embrace the horizontally-disposed arm 14 of the axle member as is best shown in Fig. 3, being secured together by means of suitable bolts.

With the frame 10 resting upon the ground as is shown in Fig. 2, it will be understood that the axle member with the wheel 15 mounted thereon can be turned at right angles to the position shown in Fig. 2, the arm 13 being free to rotate in the sleeve 11, and the pin 23 mounted on the clip 24 being likewise free to rotate within the collar 22, inasmuch as the collar 22 and the sleeve 11 are located concentrically with respect to each other. The clip 24 is provided with a depending pin 25 which is adapted to engage either of the holes 26 and 27 in the bracket 12, depending on whether the wheel 15 is in the position shown in Fig. 1 or in the position indicated by dotted lines in Fig. 4. As will be readily understood the pin 25 serves to hold the wheel 15 against swinging about the vertical arm 13 of the axle member when the frame is in its raised position with respect to the wheel.

With the parts in the position shown in Fig. 1, the frame 10 is held in its raised position with respect to the supporting wheel 15 through the medium of the link connections between the frame 10 and the axle member. While I have shown the upper one of the train of links in the form of an arm of the bellcrank lever 17, it will be understood that I do not wish to limit myself to this precise form of structure except as hereinafter specifically claimed. The train of links is enabled to support the frame 10 upon the wheel 15 by reason of standing in a past-center locking position with respect to the pins 18 and 21, the links being adapted to buckle toward the left as shown in Fig. 2, but being held against buckling to any material extent in the opposite direction by reason of one of the links being brought into contact with a portion of the bracket 16 as is shown at 28 in Fig. 1.

As will be appreciated from an inspection of Fig. 2, when the lever 17 is given a stroke in clockwise direction in Fig. 1 from the position shown in that figure, the links comprising the short arm of the lever and the part 19 are buckled to the left, permitting the bracket 16 and the frame 10 to descend with respect to the wheel. After the frame 10 has come to rest upon the ground, a further movement of the lever 17 in clockwise direction in Fig. 2 serves to raise the wheel 15 from the ground, but normally the wheel 15 is left in position upon the ground, to act to a limited extent as an anchor for the frame for holding the frame steadily in position upon the ground.

While I have shown my improved wheel mounting in connection with the frame 10 which forms a part of an operative machine structure, such as a beet elevator mechanism, it will be understood that I do not wish to be restricted to the use of such a frame, except as hereinafter specifically claimed, inasmuch as the frame may be of any desirable type for supporting other operative parts or may be if desired merely the frame of a jack construction for use independently for any desired work.

What I claim as my invention and desire to secure by Letters Patent is:—

1. The combination of a frame, a supporting wheel mounted thereon, said wheel being movable horizontally into different positions with respect to the frame, means for vertically moving said frame to cause it to rest upon the ground or be raised therefrom, and means for locking the wheel in its said different adjusted positions.

2. The combination of a frame, a supporting wheel mounted thereon, said wheel being movable horizontally into different positions with respect to the frame, means for vertically moving said frame to cause it to rest upon the ground or be raised therefrom, and means for locking the wheel in its said different adjusted positions when the frame is raised from the ground.

3. The combination of a frame, an axle having pivotal connection with the frame to adapt said axle to be swung horizontally, a supporting wheel carried by the axle, means for vertically moving the frame to cause it to rest upon the ground or be raised therefrom, and means for locking the axle to the frame in the different horizontally-adjusted positions of the axle.

4. The combination of a vertically-movable frame, a supporting wheel therefor, a bellcrank lever, a link pivotally connected with both said wheel and one arm of the bellcrank lever, and a bracket securing the lever to the frame and serving both as a support for said lever and as a stop to hold the lever and link against movement when the frame is in raised position.

5. The combination of a vertically-movable frame, a supporting wheel therefor, means for permitting said wheel to be turned into different adjusted positions with respect to said frame, means for locking said wheel in such different adjusted positions, a bell crank lever, a link pivotally connected with both said wheel and one arm of the bellcrank lever, and a bracket secured to the frame for supporting said lever and also serving as a stop to hold the lever and link against movement when the frame is in raised position.

6. The combination of a frame, a supporting wheel therefor, an angular rigid axle member, upon the horizontal portion of which said wheel is journaled, and with the vertical portion of which the said frame has a sliding connection to permit vertical adjustment of the frame, said axle member being adapted to be swung into different positions with respect to said frame, a pivoted lever supported from the frame, a link connected at one end with said lever, and means pivotally connecting the other end of the link with said axle member and permitting the axle member to freely swing relatively to the frame.

7. The combination of a frame, a supporting wheel therefor, an angular rigid axle member upon the horizontal portion of which said wheel is journaled, and with the vertical portion of which the said frame has a sliding connection to permit vertical adjustment of the frame, said axle member being adapted to be swung into different positions with respect to said frame, a pivoted lever supported from the frame, a link connected at one end with said lever, means pivotally connecting the other end of the link with said axle member and permitting the axle member to freely swing relatively to the frame, and means for locking said axle member and its wheel in different adjusted positions.

8. The combinaton of a frame, a supporting wheel therefor, an angular rigid axle member upon the horizontal portion of which said wheel is journaled, and with the vertical portion of which the said frame has a sliding connection to permit vertical adjustment of the frame, said axle member being adapted to be swung into different positions with respect to said frame, a pivoted lever supported from the frame, a link connected at one end with said lever, and a horizontally-rotatable device mounted on said axle member with which rotatable member said link has pivotal connection.

9. The combination of a frame, an axle member adjustable vertically with respect to said frame and also adapted to swing about a vertical axis on said frame, a supporting wheel for said frame journaled upon a horizontal axis upon said axle member, a link connected with said axle member and adapted to swing about a horizontal axis and also to turn upon a vertical axis with respect thereto, a second link pivotally connected with said first-named link and with a portion of said frame, and means limiting the pivotal movement of said links to one side of their line of centers whereby said links act as a past-center locking mechanism, said links being adapted in their locking position to hold the frame in raised position upon said supporting wheel and being adapted when released from past-center locking position to permit the frame to descend and rest directly upon the ground.

10. The combination of a frame, a vertically-disposed sleeve thereon, an axle member, comprising two arms at right angles to each other, one of said arms being slidably and revolubly mounted in said sleeve, a supporting wheel journaled upon the other arm of said axle member, a clip fixedly mounted on said axle member, a bracket mounted on said frame above said sleeve, a bellcrank lever pivotally mounted on said bracket above said clip, and a link pivotally connected to one arm of said bellcrank lever and having both a pivotal and a swiveling connection with said clip, said bellcrank lever being operable for raising and lowering said frame with respect to said wheel and said wheel being adapted to turn on its vertical axis with respect to said frame in either its raised or its lowered position.

LEONARD B. NEIGHBOUR.